Dec. 28, 1926.

M. J. McNAUGHTON

SKILLET ATTACHMENT

Filed March 8, 1926

1,612,521

INVENTOR
M. J. McNaughton.
BY
ATTORNEY

Patented Dec. 28, 1926.

1,612,521

UNITED STATES PATENT OFFICE.

MELVIN J. McNAUGHTON, OF MIDDLEBURY, VERMONT.

SKILLET ATTACHMENT.

Application filed March 8, 1926. Serial No. 93,295.

This invention relates to cooking utensils and has special reference to an attachment for the handles of skillets, frying pans and the like designed to be removably placed on the handle to prevent the weight of the latter from tilting the utensil.

The principal object of the present invention is to provide a simple and efficient device adapted to fit various sizes of skillet and frying pan handles and removably attachable thereto, in a single manner, so as to project below the handle and rest on the stove top, thereby preventing accidental tilting due to the weight of said handle.

With the above and other objects in view as will be hereinafter apparent, the invention consists in general of certain novel details of construction and combinations of parts hereinafter fully described, illustrated in the accompanying drawings and specifically claimed.

In the accompanying drawings like characters of reference indictate like parts in the several views, and:

Figure 1:
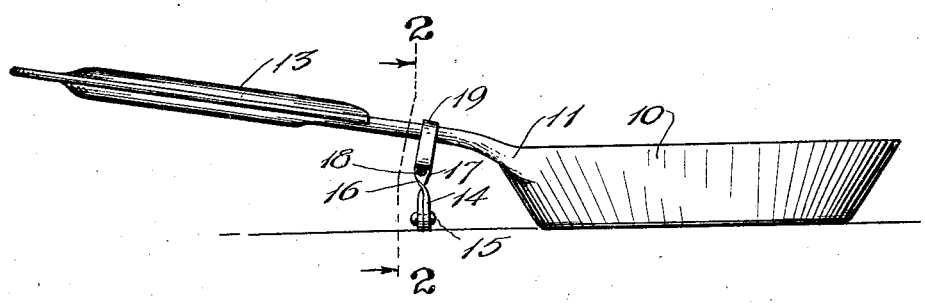
Figure 1 is a side elevation of the invention applied to a skillet or frying pan.
Figure 2:
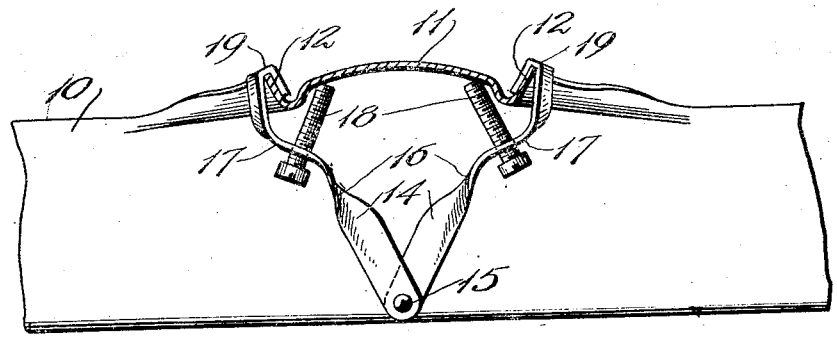
Figure 2 is an enlarged section on the line 2—2 of Figure 1.
Figure 3:
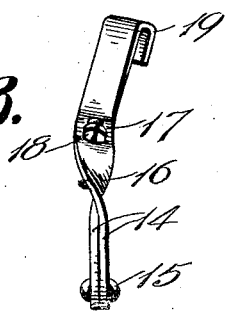
Figure 3 is an enlarged detail side view of the device removed from the skillet.

In the invention as here shown there is disclosed a frying pan or skillet 10 having a pressed or stamped handle 11 projecting from one side. This handle has its lateral edges turned up to form flanges 12 and its outer end is provided with a grip 13. These parts are common to stamped or pressed steel skillets and, while cooperating with the invention form no specific part thereof.

The invention itself consists of a pair of legs pivotally connected and each leg consists of a flat strip of metal whereof one end 14 overlaps the corresponding end of the other strip and is connected thereto by the pivot 15. Intermediate their ends these strips are twisted through a quarter turn 16 and have the portions adjacent the twists divergingly inclined as at 17, these portions being tapped for the reception of clamp screws 18. Above the portions 17 the strips terminate in inwardly directed hooks 19.

In use these hooks 19 are engaged on the flanges 12 and the screws 18 tightened to bear against the under side of the handle 11, the attachment being positioned on the handle at such point that the pivoted ends 14 will rest on the stove top with the skillet level. Obviously under these conditions tilting of the skillet is prevented.

There has thus been provided a simple and efficient device of the kind described and for the purpose specified.

It is obvious that minor changes may be made in the form and construction of the invention without departing from the material spirit thereof. It is not, therefore, desired to confine the invention to the exact form herein shown and described, but it is desired to include all such as properly come within the scope claimed.

Having thus described the invention, what is claimed as new, is:

1. An attachment for skillets and the like comprising a pair of legs pivotally connected at one end of each and each having an inwardly directed hook at the opposite ends adapted to engage a skillet handle, and clamp screws carried by said legs and positioned to engage beneath said handle upon the latter being gripped by the hooks.

2. An attachment for skillets and the like consisting of a pair of legs having ends in overlapping relation, a pivot connecting said ends, said legs having diverging portions above their pivoted ends and being provided with inwardly directed terminal hooks, and clamping screws threaded in said diverging portions.

In testimony whereof I affix my signature.

MELVIN J. McNAUGHTON.